(12) United States Patent
Schmidt (10) Patent No.: US 8,624,463 B2
(45) Date of Patent: Jan. 7, 2014

(54) TRANSVERSE FLUX MOTOR AS AN EXTERNAL ROTOR MOTOR AND DRIVE METHOD

(75) Inventor: Michael Schmidt, Neukirchen OT Dänkritz (DE)

(73) Assignee: Leantec Motor GmbH & Co. KG, Saalfeld (DE)

( * ) Notice: Subject to any disclaimer, the term of this patent is extended or adjusted under 35 U.S.C. 154(b) by 343 days.

(21) Appl. No.: 13/127,137

(22) PCT Filed: Oct. 22, 2009

(86) PCT No.: PCT/DE2009/001492
§ 371 (c)(1),
(2), (4) Date: May 18, 2011

(87) PCT Pub. No.: WO2010/048928
PCT Pub. Date: May 6, 2010

(65) Prior Publication Data
US 2011/0210626 A1     Sep. 1, 2011

(30) Foreign Application Priority Data

Oct. 30, 2008  (DE) .......................... 10 2008 053 895
May 15, 2009  (DE) .......................... 10 2009 021 540

(51) Int. Cl.
| | |
|---|---|
| H02K 1/06 | (2006.01) |
| H02K 21/12 | (2006.01) |
| H02K 1/24 | (2006.01) |
| H02K 19/06 | (2006.01) |
| H02K 19/20 | (2006.01) |
| H02K 19/24 | (2006.01) |
| H02K 23/42 | (2006.01) |
| H02K 37/02 | (2006.01) |
| H02K 41/03 | (2006.01) |

(52) U.S. Cl.
CPC *H02K 1/24* (2013.01); *H02K 1/246* (2013.01); *H02K 19/06* (2013.01); *H02K 19/20* (2013.01); *H02K 19/24* (2013.01); *H02K 23/42* (2013.01); *H02K 37/02* (2013.01); *H02K 41/03* (2013.01)

USPC ...... 310/216.023; 310/46; 310/268; 310/269; 310/156.02

(58) Field of Classification Search
CPC ......... H02K 1/24; H02K 1/246; H02K 19/06; H02K 19/20; H02K 19/24; H02K 23/42; H02K 37/02; H02K 41/03
USPC ............................... 310/46, 156.02, 268, 269
See application file for complete search history.

(56) References Cited

U.S. PATENT DOCUMENTS

| | | | |
|---|---|---|---|
| 4,223,255 A | | 9/1980 | Goldman et al. |
| 5,168,187 A | * | 12/1992 | Baer et al. ................. 310/49.12 |

(Continued)

FOREIGN PATENT DOCUMENTS

| | | |
|---|---|---|
| DE | 10033799 A1 | 10/2001 |
| EP | 1720236 A1 | 11/2006 |
| EP | 1953902 A2 | 8/2008 |

OTHER PUBLICATIONS

Weh, H: "Die Transversalflussmaschine" [The Transverse Flux Machine], Jahrbuch der Schiffbautechnischen Gesellschaft, Berlin, Germany, vol. 86, Jan. 1, 1992, pp. 68-73, XP002043271—English abstract.

*Primary Examiner* — John K Kim
(74) *Attorney, Agent, or Firm* — Laurence A. Greenberg; Werner H. Stemer; Ralph E. Locher (57) ABSTRACT

The invention relates to a transverse flux motor comprising at least one stator and at least one rotor. Magnetically active elements of the stator are formed in an annular manner and with a U-shaped inner contour on the stator and the rotor is in the form of a disk or a ring. The rotor comprises magnetically active sections consisting of a soft-magnetic or permanent-magnetic material, that are radially oriented in an annular manner towards at least one front surface of the rotor. The invention also relates to a drive method according to the transverse flux principle, whereby magnetically active sections of at least one disk-type or annular rotor, that are radially oriented in an annular manner towards at least one front surface of the rotor, interact with magnetically active elements having a U-shaped inner contour in an annular manner on at least one stator, in order to rotate the rotor.

15 Claims, 8 Drawing Sheets

(56) References Cited

U.S. PATENT DOCUMENTS

| | | | |
|---|---|---|---|
| 5,982,070 A * | 11/1999 | Caamano | 310/216.047 |
| 6,700,271 B2 * | 3/2004 | Detela | 310/164 |
| 6,777,838 B2 * | 8/2004 | Miekka et al. | 310/67 R |
| 7,034,425 B2 * | 4/2006 | Detela | 310/162 |
| 2004/0251759 A1 * | 12/2004 | Hirzel | 310/114 |
| 2005/0116569 A1 * | 6/2005 | Fahy | 310/168 |
| 2006/0119215 A1 * | 6/2006 | Ritz et al. | 310/268 |
| 2008/0179982 A1 * | 7/2008 | Kramer | 310/168 |
| 2008/0284267 A1 * | 11/2008 | Purvines | 310/112 |
| 2009/0322165 A1 * | 12/2009 | Rittenhouse | 310/43 |
| 2011/0025067 A1 * | 2/2011 | Cipriani | 290/52 |
| 2011/0210626 A1 * | 9/2011 | Schmidt | 310/46 |

* cited by examiner

TRANSVERSE FLUX MOTOR AS AN EXTERNAL ROTOR MOTOR AND DRIVE METHOD

BACKGROUND OF THE INVENTION

Field of the Invention

The present invention relates to a transverse flux motor, in the form of an external rotor motor, having at least one stator and at least one rotor, wherein magnetic active elements of the stator are annular and have a U-shaped internal profile on the stator, and the rotor is in the form of a disk or is annular, wherein the rotor has magnetically active webs which are provided in the form of a ring in radial alignment on at least one end surface of the rotor. Furthermore, the present invention relates to a drive method based on the transverse flux principle, with magnetically active webs of at least one rotor which is in the form of a disk or is annular being caused to rotate about the rotor, which webs are arranged in the form of a ring in radial alignment on at least one end surface of the rotor, which interact with magnetically active elements which are provided in the form of a ring on at least one stator and have a U-shaped internal profile.

A drive method of the generic type mentioned above is known from the document EP 1 720 236 A1. This document discloses a low-noise modular direct drive based on the reluctance principle. The direct drive has a rotor with an annular cross section and with radial slots on both end faces. Furthermore, the known direct drive has a stator ring composed of U-shaped plates. The U-plates are either assembled such that the U-shaped internal profiles of the U-plates in the stator ring open either radially inward or radially outward. In one embodiment variant of the document EP 1 720 236 A 1, the rotor ring is arranged within the U-shaped internal profiles of the U-plates of the stator ring such that it can rotate within the stator ring (internal rotor). In another embodiment variant, in which the U-plates of the stator ring are open radially outward, the rotor ring is fitted in between the U-shaped internal profiles such that it can rotate externally on the stator ring (external rotor). In both embodiment variants, the stator ring and rotor ring are physically offset through 90° with respect to one another.

BRIEF SUMMARY OF THE INVENTION

In the reluctance machine described in the document EP 1 720 236 A 1, the radially aligned U-plates of the stator are composed of soft-magnetic material and act as stator teeth, while the radial slots in the rotor composed of soft-magnetic material act as rotor teeth. The stator teeth are wound with coils which are switched on and off alternately. The teeth with the windings through which current flows each electromagnetically attract the closest tooth on the rotor and are switched off when or shortly before the teeth on the rotor are opposite the stator teeth which attract them. In this position, the next phase is applied to other stator teeth, which attract other rotor teeth. The rotor is moved in a rotation direction in this way.

Since, in the known embodiment, relatively small pole pitches can be provided, high specific torques can be achieved. Furthermore, in the known arrangement, the power flux path for the pulsating attraction forces between the stator and the rotor is closed on a short path, resulting in advantageous symmetry conditions between the stator and the rotor, in order to compensate as far as possible for the effect of these forces on the stator and rotor. Relatively low noise emission can correspondingly be achieved.

In order to achieve a largely constant torque in all rotor positions, the document EP 1 720 236 A 1 furthermore proposes the provision of a minimum number of three separate winding sections, that is to say three stator windings which are electrically fed with a phase shift, which can be achieved by arranging three machines axially in a row.

If the aim is to achieve as small an air gap as possible, which remains constant all the time, between the stator and the rotor in the known arrangement, the U-shaped internal profiles of the U-plates of the stator, in particular, must be manufactured with high precision. The hollow cylinder of the rotor must be fitted exactly into the space between the U-shaped internal profiles of the U-plates. This involves considerable technological effort. It can also be assumed that, during the course of use of the known reluctance machine, particularly as a result of wear to it, variances will occur in the air-gap size, thus allowing changes to occur in the efficiency of the known reluctance machine. Furthermore, in the known reluctance machine, both the U-plates and the hollow cylinder which is used for the rotor are formed from soft-magnetic material, as a result of which the direct drive is relatively heavy and is unsuitable for many application options, for example directly on the wheels of a vehicle.

The object of the present invention is therefore to provide a direct drive based on the transverse flux principle, which makes it possible to provide a high torque with, at the same time, as low a weight as possible, high reliability and a direct drive whose effectiveness is as constant as possible and which can operate not only on the reluctance principle but also as a synchronous machine with permanent magnetic excitation, achieving an even greater power density.

This object is achieved by a transverse flux motor of the generic type mentioned above, in which vertical profile sides of the U-shaped internal profile are aligned parallel to the axial alignment of the stator, and free ends of the vertical profile sides of the U-shaped internal profile have poles which are separated from one another, with the rotor being connected to a rotatable motor cage or a motor casing, and with the stator being connected to a stationary support or to a stationary shaft. In this case, the motor cage is an external rotating element or an externally rotating component, for example a roller or rim, with which the rotor rotates. In the end, this results in an external rotor motor which is stationary internally and in which the outer part, that is to say the motor cage, of the motor rotates.

In the solution according to the invention, the at least one stator is therefore aligned parallel to the at least one rotor, with one end face of the stator being directly opposite one end face of the rotor. This allows a very precise air gap to be set between the stator and the rotor using simple technological facilities, thus making it possible to achieve high efficiency and a transverse flux motor effectiveness which is continuously constant. As a result of the advantageous symmetry which can be achieved in this way between the stator and the rotor, noise emissions can be largely minimized without having to increase the weight of the arrangement. Furthermore, a multiplicity of poles can be formed on the rotor by the annular arrangements of the magnetically active elements on the stator of the magnetically active webs, thus making it possible to achieve high specific torques.

In one preferred refinement of the invention, with the design otherwise being identical, the teeth on the rotor are formed from soft-magnetic material (reluctance machine) or from permanent magnets (synchronous machine with permanent magnet excitation). The motor according to the invention, which is in the form of an external rotor motor, therefore offers optimum preconditions for use as an internal roller drive or wheel drive.

It is particularly advantageous for the rotor webs to consist of permanent-magnetic material and therefore to allow the present invention to be operated as a synchronous machine with permanent magnet excitation. While, in the case of a reluctance motor, the rotary movement is produced only by electromagnetically produced pulling forces, in the case of a synchronous machine with permanent magnet excitation, pulling and pushing forces are used, resulting in a higher power density. Furthermore, in the case of a synchronous machine with permanent magnet excitation according to the invention, two phases are sufficient to produce a continuous rotary movement.

In one advantageous embodiment of the present invention, the vertical profile sides of the U-shaped internal profile are separated by a distance in the radial alignment of the stator, which distance corresponds approximately to the length of the radial extent of the webs on the rotor. The poles on the stator and the rotor can thus be made to coincide with one another in a suitable manner to allow effective rotation of the rotor.

In one preferred example of the present invention, the stator has three, four or more magnetically active elements which are arranged uniformly on the stator, are separated from one another uniformly and are in the form of rings or ring segments. A multiplicity of magnetically active poles can in each case be combined in the ring segments and can be provided jointly with one or more windings, thus allowing current to flow through a plurality of poles at the same time, in order to produce different phases. This means that it is possible to arrange a plurality of phases per ring, or else only one phase per ring.

In this case, it is particularly advantageous if current can flow through the rings or ring segments with a phase shift with respect to one another. This makes it possible for current to flow through the three, four or more ring segments sequentially, in pairs or in some other suitable sequence or grouping, in order to cause the rotor to rotate.

In one particularly advantageous embodiment variant of the present invention, the poles are like teeth, with each pole on one vertical profile side of a ring segment being opposite one pole on the other vertical profile side of the ring segment in the radial alignment of the stator. A separate U-profile is therefore formed by the poles which are in each case arranged opposite, which U-profile is arranged opposite one web on the rotor and can be made to coincide with it, in order to drive the rotor in a suitable manner.

In one preferred example of the present invention, the transverse flux motor is designed like a sandwich, with a rotor being arranged between a first and a second stator such that each of the end surfaces of the rotor is opposite a stator end surface with ring segments which project axially therefrom in the direction of the rotor. The sandwich-like configuration offers the advantage that, when current flows through the two stators in the same way, force equalization occurs, since axially symmetrical and radially symmetrical loads are balanced out on a structure such as this. Correspondingly, this allows the transverse flux motor according to the invention to run more smoothly.

It is particularly advantageous if four identical ring segments are in each case provided on the first stator and on the second stator, with the stators being arranged such that the ring segments are each opposite, and in which case current can flow through the ring segments with a phase shift of 180° such that current flows through respectively opposite ring segments. This allows suitable axially and radially symmetrical force equalization between the stators and the rotor of the transverse flux motor according to the invention in a simple manner from the connection point of view. In this arrangement, four ring segments act on one rotor disk or one rotor ring per phase. Correspondingly, with the same number of poles because of the arrangement on both sides, twice the number of poles act on the rotor, thus resulting in greater flux and therefore a higher torque.

In a further favored embodiment variant of the present invention, the transverse flux motor has a plurality of stacked sandwich-like stator-rotor-stator arrangements. This embodiment makes it possible to achieve a particularly high torque. In addition, this embodiment variant makes it possible for current to flow differently through the stack levels of the stacked sandwich structures, thus making it possible for the transverse flux motor according to the invention to achieve particularly high efficiency when current flows in a suitable sequential form through the individual stack levels. The extension to a plurality of stack levels not only makes it possible to directly proportionally increase the torque, but also to improve the positioning capability, to achieve smoother running, and to reduce the maximum current despite the proportional increase in performance.

In one advantageous development of the present invention, the stator has a support composed of a non-magnetic material, and the ring segments are formed from soft-magnetic material. This makes it possible to greatly reduce the weight of the stator, thus considerably improving the options for use of the transverse flux motor according to the invention, in particular for drive configurations in the vehicle field.

According to one preferred variant of the invention, the support is formed from a fiber composite material. By way of example, a glass-fiber-reinforced fiber composite material can be used. Support materials such as these have the advantage that they are very light in weight and therefore provide a better dynamic response for the transverse flux motor according to the invention. Furthermore, materials such as these allow smooth disks or rings to be produced, as a result of which the drag is reduced, and the transverse flux motor according to the invention is quieter. Fiber composite materials, such as CFC or AFC, avoid magnetic shunts, since the energy of motion is a function of the difference in the flux between the aligned state and the non-aligned state, resulting in an increase in torque. Furthermore, the use of fiber composite materials as support materials for the stator makes it possible to deliberately influence the characteristics of the stator disk or stator ring, such as the elasticity and/or the oscillation response.

Furthermore, it has been found to be particularly advantageous for at least one of the ring segments to be composed of a plurality of individual segments. The individual segments can be produced in a technologically simple manner and then be assembled in a suitable manner on the stator to form a ring segment. This makes it possible to reduce the technology costs for production of the transverse flux motor according to the invention, and to improve the accuracy with which the ring segments are constructed.

According to a further preferred embodiment of the present invention, the stator has at least one internally hollow winding. In addition to its coil function on the transverse flux motor according to the invention, the internally hollow winding can be used to cool the transverse flux motor during its operation, since a cooling liquid can be passed through the internally hollow winding.

In one particularly preferred variant of the invention, the internally hollow winding is in the form of a copper tube. This is particularly highly suitable for providing the desired electromagnetic characteristics of the transverse flux motor and, furthermore, for use as a cooling mechanism, by passing a cooling liquid through the internally hollow copper tube.

In one advantageous exemplary embodiment of the invention, the connection of the stator to a U-shaped support allows free rotation about the rotation axis.

In one advantageous development of the invention, the stator support, the stator ring segments and the conductor winding are combined to form a stator block, for example by encapsulation or a lamination process using electrically non-conductive binding agents. This enhances the mechanical robustness of the stator, improves the oscillation response and achieves optimum fixing and isolation of the conductor winding. Furthermore, this reduces the assembly effort.

The object of the present invention is also achieved by a drive method of the generic type mentioned above, in which the magnetically active elements on the stator are at least three rings or ring segments through which current flows differently, with the vertical profile sides of the U-shaped internal profile of the ring segments being aligned parallel to the axial alignment of the stator, and with free ends of the vertical profile sides of the U-shaped internal profile having poles which are separated from one another, and with the rotor being moved around a pole in the rotation direction in relation to the stator when any current flows through.

In the drive method according to the invention, the stator can be arranged flat opposite the rotor. This has the advantage that the air gap between the stator and the rotor can be set to be very small. Furthermore, a multiplicity of poles can be arranged on the surface of the stator which is in the form of a disk or ring thus making it possible to achieve a high efficiency and a high torque by means of the drive method according to the invention. Furthermore, current can flow differently in a simple manner through the at least three rings or ring segments which are provided on the stator, thus providing a drive based on the drive method according to the invention, which can be electrically connected and can be operated in a simple manner.

In one advantageous development of the present invention, the rotor is arranged like a sandwich between a first stator having four ring segments and a second stator having four ring segments, current flows through the ring segments of the first and of the second stator with a phase shift of 180°, and current flows in the same way through the ring segments which are opposite on the stators. This makes it possible to provide a symmetrical stator-rotor-stator arrangement in which suitable force compensation is provided between the stators and the rotor. This makes it possible to provide a very smooth-running transverse flux motor with high efficiency.

In one particularly advantageous embodiment of the present invention, a plurality of stator-rotor-stator arrangements which are formed like a sandwich are provided as a stack arrangement, with current flowing through the stack levels sequentially with a phase shift with respect to one another. The stack arrangement results in a series of combination options for the circuit of the arrangement. It is correspondingly possible to switch any of the stack levels of the stack arrangement less often, but nevertheless to achieve a high torque with the drive method according to the invention by means of the combination of the phases, poles and levels of the stack arrangement.

It is particularly advantageous if, in the case of an arrangement in which a stator is arranged opposite the rotor and is associated with it, current flows sequentially through the stator at least on three rings of ring segments which are arranged uniformly on the stator. Current flow to at least three rings or ring segments, that is to say three phases, is at least necessary in order to achieve a continuous rotary movement when using the drive method according to the invention.

However, it is even better for the minimum number of the phases and therefore of the rings or ring segments of the stator to be three+one, in order to achieve a radially symmetrical load distribution on the transverse flux motor. In this configuration, it is also possible for current to flow through a plurality of phases at the same time, thus making it possible to increase the torque and the power.

Advantageous embodiments of the present invention will be explained in more detail in the following text with reference to the figures of the drawing, in which:

DESCRIPTION OF THE INVENTION

Figure 1:
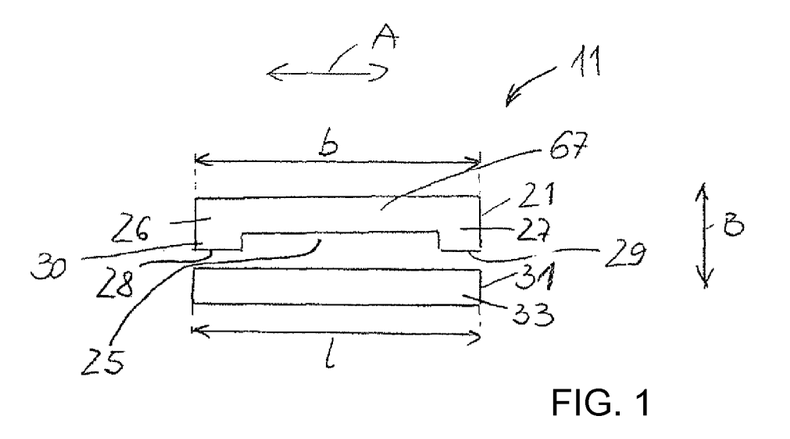
FIG. 1 shows a schematic sectioned side view of a magnetically active element, arranged opposite a rotor web, of a stator according to one embodiment of the transverse flux motor according to the invention, in which only one stator and one rotor are provided.

FIG. 1 shows a schematic sectioned side view of a fundamental principle of a transverse flux motor 11 according to the invention, through a magnetically active element of a stator 21 and a magnetically active web 33 of a stator 31.

The magnetically active element of the stator 21 is provided in the form of a ring on the stator 21 and has an internal profile 25 with a U-shaped cross section. The vertical profile sides 26, 27 of the U-shaped internal profile 25 are aligned parallel to the axial alignment B of the stator 21. The lateral web 67, which connects the vertical profile sides 26, 27, is aligned with the radial alignment A of the stator 21.

Figure 4:
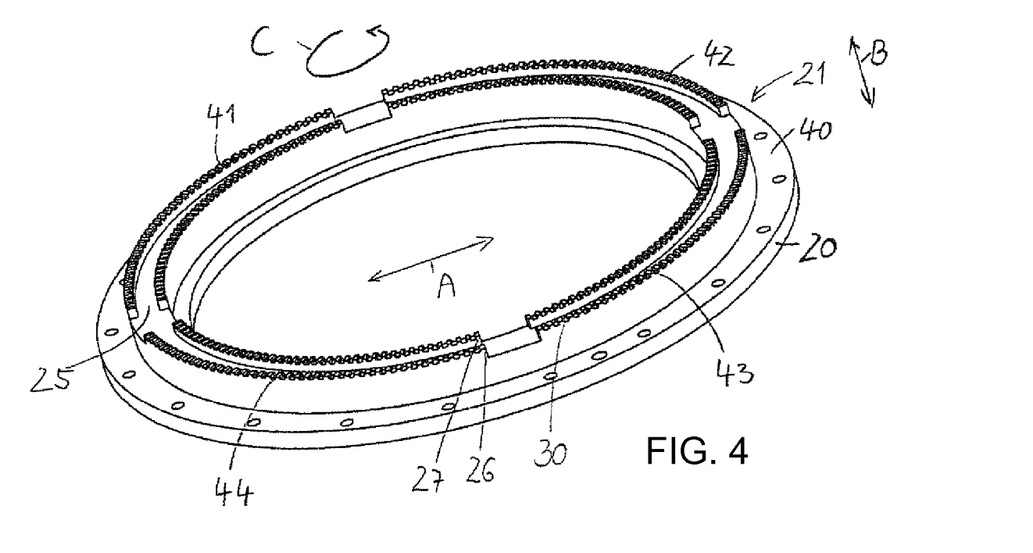
FIG. 4 shows a schematic perspective view of one embodiment variant of a stator of the transverse flux motor according to the invention.

As shown by way of example in FIG. 4, a multiplicity of magnetically active elements of the stator 21, in each case combined to form ring segments 41, 42, 43, 44, are arranged on one end surface 40 of the stator 21.

As FIG. 4 also shows, the free ends 28, 29 of the vertical profile sides 26, 27 of the U-shaped internal profile 25 of the stator 21 from FIG. 1 form poles 30 which are in the form of teeth and are separated from one another.

A magnetically active web 33 of the rotor 31 is provided opposite the stator 21 in the axial alignment B of the stator 21. Depending on the rotation of the rotor 31 relative to the stator 21, the rotor web 33 is directly opposite the magnetically active element of the stator 21, as is shown in FIG. 1, only in certain situations.

Figure 5:
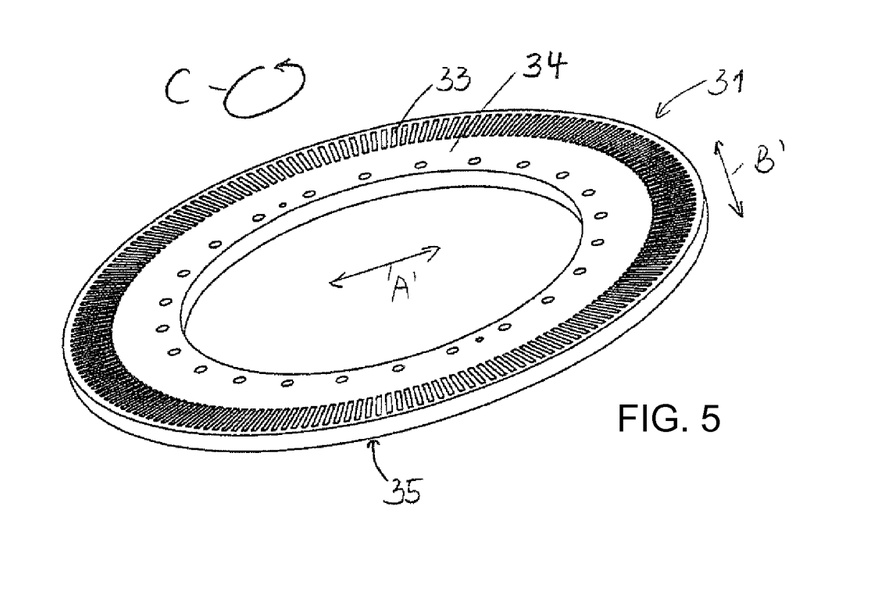
FIG. 5 shows a schematic perspective view of one embodiment variant of a rotor of the transverse flux motor according to the invention.

As FIG. 5 shows, a multiplicity of webs 33 are arranged in the form of a ring in the radial alignment A' on an end face 34 of the rotor 31. The webs 33 have a length l in the radial extent on the rotor 31, which corresponds approximately to a distance b between the vertical profile sides 26, 27 of the U-shaped internal profile 25 of the magnetically active elements on the stator 21 in the radial alignment A of the stator 21.

At least one winding 50 is now provided on each of the ring segments 41, 42, 43, 44 on the stator 21.

The magnetically active elements of the stator 21 and the magnetically active webs 33 of the rotor 31 are composed of a soft-magnetic material.

Figure 7:
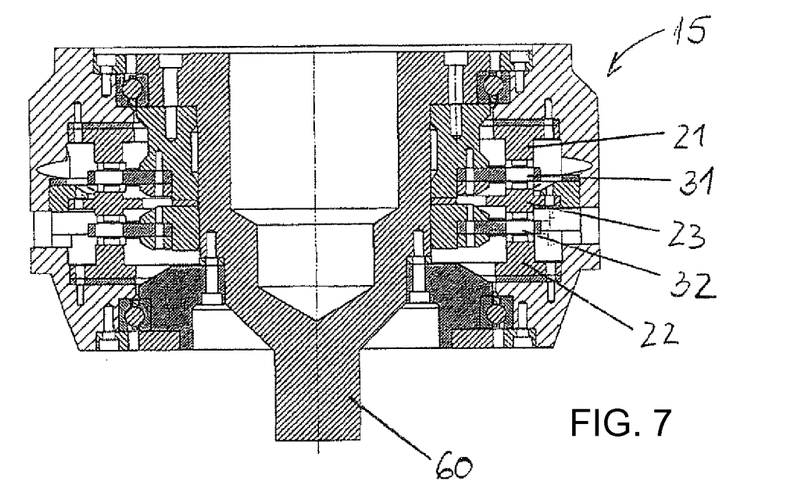
FIG. 7 shows a schematic sectioned side view of yet another embodiment of the transverse flux motor according to the invention with a stator-rotor-stator-rotor-stator sandwich arrangement.

Since the number of the stator poles 30 is less than the number of the rotor webs 33, the rotor 31, which is attached to a shaft 60 such that it can rotate, for example as is illustrated in FIG. 7, tries to align at least one of its webs 33 with one of the poles 30 of the stator 21, depending on the existing magnetic field, such that a stator pole 30 is coincident with a rotor web 33 and is thus aligned in the direction of the least magnetic reluctance.

In order to produce a rotary movement, current must be able to pass differently through at least three phases on the stator 21, that is to say at least three ring segments 41, 42, 43 composed of magnetically active elements. However, it is also possible to provide more than three phases or ring segments 41, 42, 43, 44, as is shown in FIG. 4.

If the aim is to achieve radial symmetry with respect to the load, it is recommended that a minimum number of four phases or different ring segments 41, 42, 43, 44 through which current can flow be provided on a stator 21, 22, 23, 24.

Figure 2:
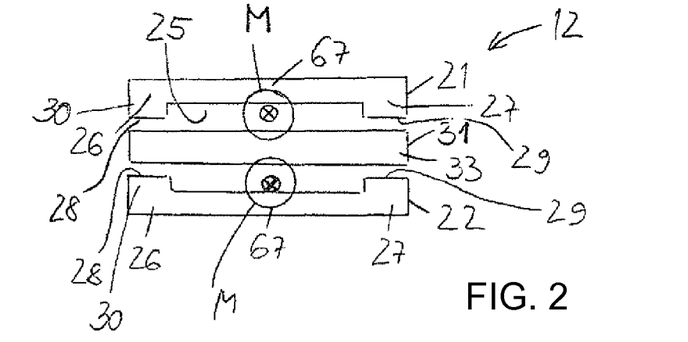
FIG. 2 shows a schematic sectioned side view of a rotor web, which is arranged between two magnetically active elements of two stators, according to a further embodiment of the transverse flux motor according to the invention, in which a rotor is provided like a sandwich between the two stators.

FIG. 2 shows a schematic sectioned side view of the fundamental principle of a further embodiment variant of a transverse flux motor 12 according to the invention, illustrating a magnetically active element of a first stator 21, a rotor web 33 and a magnetically active element of a second stator 22. The rotor web 33 is provided like a sandwich between the magnetically active elements of the first stator 21 and of the second stator 22. As is shown in FIG. 4, the stators 21, 22 are annular, with the rotor 31 being in the form of a ring, as is shown in FIG. 5, and being arranged between the two stators 21, 22. For this purpose, the rotor ring has rotor webs 33 not only on its upper end face 34, as shown in FIG. 5, but also on its lower end face 35, and these rotor webs 33 are arranged, separated by uniform distances, radially aligned on the respective end face 34, 35.

The magnetically active elements of the stators 21, 22 each have a U-shaped internal profile 25, with the vertical profile sides 26, 27 of the U-shaped internal profiles being aligned parallel to the axial alignment B of the stators 21, 22, and with the free ends 28, 29 of the vertical profile sides 26, 27 of the U-shaped internal profiles 25 having poles 30 which are in the form of teeth and are at a distance from one another. At least one winding 50 is provided on each of the ring segments 41, 42, 43, 44 of the stators 21, 22. Three to five windings are typically provided per ring segment 41, 42, 43, 44 of the stators 21, 22.

FIG. 2 uses the circles M to schematically illustrate the formation of the magnetic fields between the stators 21, 22 and the rotor 31. In a corresponding manner to the circles M, the magnetic flux in each case starts from the respective stator 21, 22, flows into the rotor 31, and flows back into the respective stator 21, 22. The parallel arrangement of in each case one stator 21, 22 on both sides of the rotor 31 results in an axially symmetrical load on the rotor 31, and in the energy of motion introduced into the rotor 31 being doubled.

Figure 3:
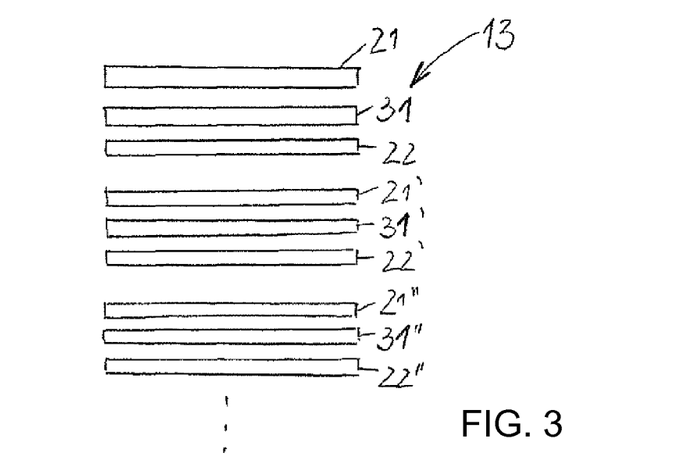
FIG. 3 shows a schematic sectioned side view of an arrangement of stators and rotors according to a further embodiment of the transverse flux motor according to the invention, which is formed from a stack arrangement of rotors which are provided like a sandwich between stators.

FIG. 3 shows a further embodiment variant of a transverse flux motor 13 according to the invention. The transverse flux motor 13 has a stack arrangement comprising a plurality of sandwich-like stator-rotor-stator arrangements as shown in FIG. 2. An arrangement in each case comprising two stators 21, 22; 21', 22'; 21", 22" is therefore provided per stack level, with a respective rotor 31, 31', 31" being arranged between them. In this case, one end face 40 of a stator 21, 22; 21', 22'; 21", 22" is in each case opposite one end face 34 or 35 of a rotor 31, 31', 31". Furthermore, the magnetically active elements of the stators 21, 22; 21', 22'; 21", 22" have a U-shaped internal profile 25 such that the vertical profile sides 26, 27 of the U-shaped internal profiles are aligned parallel to the axial alignment B of the stators 21, 22; 21', 22'; 21", 22" and axially in the direction of the rotor 31, 31', 31". The stators 21, 22; 21', 22'; 21", 22" which are arranged on both sides of the rotors 31, 31', 31" have poles 30 at the free ends 28, 29 of the U-shaped internal profiles 25, which poles 30 are in the form of teeth and are at a distance from one another.

This form of the arrangement of stacked sandwich arrangements of stator disks and rotor disks makes it possible for current to flow through the transverse flux motor 13 such that the current flows sequentially through the stack levels. This makes it possible to achieve a torque increase, an improvement in the positioning capability, smoother running and a reduction in the maximum current despite the proportional performance increase. One possible way for current to flow in a suitable manner through the transverse flux motor 13 will be explained in more detail in FIG. 10.

FIG. 4 schematically shows a stator 21, on which magnetically active elements are provided in the form of four ring segments 41, 42, 43, 44. The ring segments 41, 42, 43, 44 are arranged on one end face 40 of the stator 21 with intermediate spaces without poles provided between them, and each have U-shaped internal profiles 25 in their cross sections, as is shown in FIGS. 1 to 3. Poles 30 which are like teeth are in each case provided at the free ends 28, 29 of the vertical profile sides 26, 27 of the U-shaped internal profiles 25.

If, as is shown in FIG. 4, four ring segments are arranged on the stator 21, current can in principle flow separately through each of these ring segments. However, it is particularly advantageous for current to flow through the ring segments 41, 42, 43, 44 with a phase shift of 180°, in order in this way to produce two phases, with the same current flowing through respectively opposite ring segments 41, 43 and 42, 44. This makes it possible to achieve a radially symmetrical load on the rotor 31.

FIG. 5 schematically shows an annular rotor 31, on whose end face 34 a multiplicity of rotor webs 33 are provided, which each extend, separated by the same distance from one another, in the radial extent A' of the rotor 31. If an arrangement as shown in FIG. 1 is used, then the rotor webs 33 are arranged on only one end face 34 of the rotor 31. In the case of transverse flux motors 12, 13 as shown in FIGS. 2 and 3, rotor webs 33 are arranged radially symmetrically both on the upper end face and on the lower end face of the rotor 31.

Figure 6:
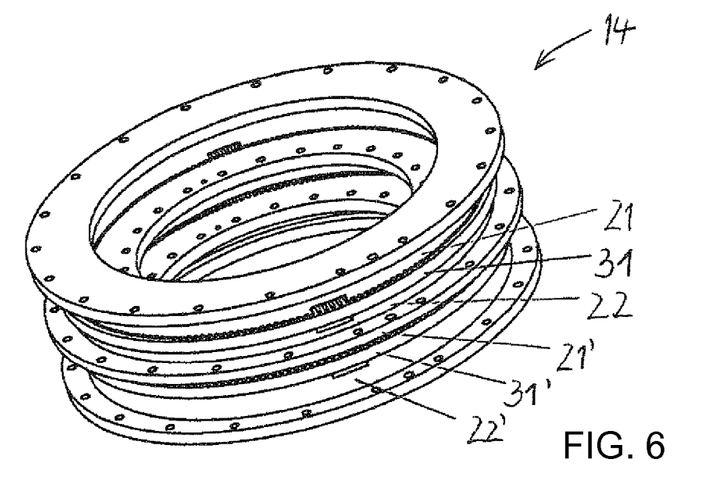
FIG. 6 shows a schematic perspective view of a further embodiment variant of the transverse flux motor according to the invention, which has a stack arrangement of two sandwich stack levels.

FIG. 6 schematically shows a stack arrangement of two stator-rotor-stator arrangements like a sandwich, as shown in the form of a cross section in FIG. 2 and FIG. 3. As shown in FIG. 6, two stators 21, 22; 21', 22' and one rotor 31, 31' are in each case provided parallel to one another in each sandwich arrangement.

FIG. 7 shows a schematic section side view of the sandwich-like stator-rotor-stator-rotor-stator arrangement. In this case, the forces can be transmitted from the rotors 31, 32 to a shaft 60, in order in this way to ensure a drive.

Figure 8:
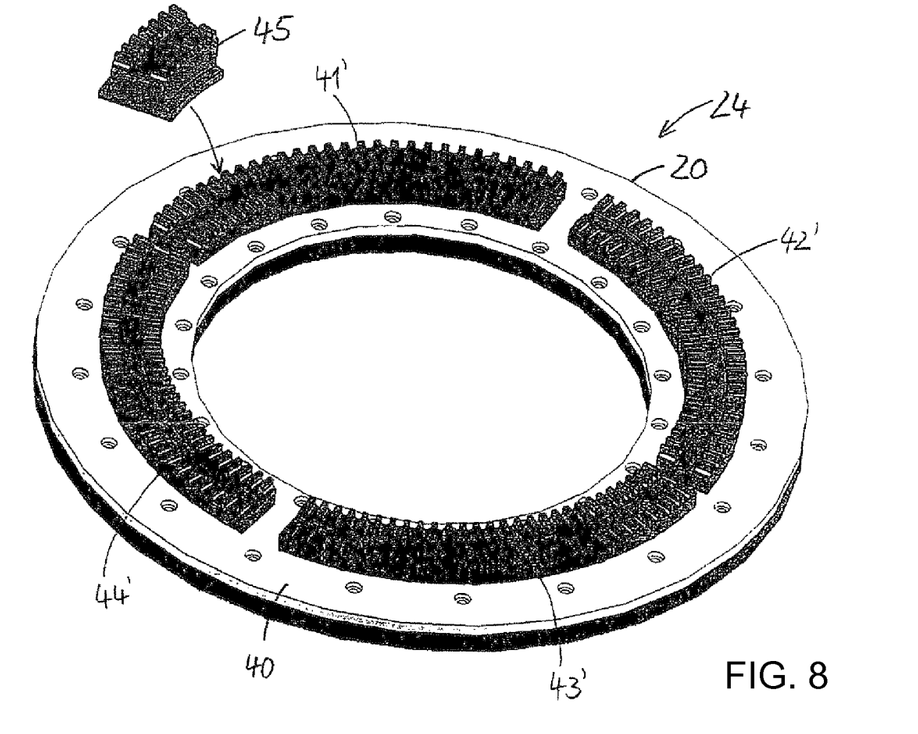
FIG. 8 shows a schematic perspective view of a stator according to one embodiment variant of the transverse flux motor according to the invention, in which the stator has ring segments formed from individual segments.

FIG. 8 schematically shows a stator 24 according to a further embodiment of the transverse flux motor 13 according to the invention, with the stator 24 having ring segments 41', 42', 43', 44' which are composed of individual segments 45. The individual segments 45 can be produced technologically more easily than the ring segments 41, 42, 43, 44 from the embodiments described above, in which case they just have to be assembled in a suitable manner to form a respective ring segment 41', 42', 43', 44'. It is therefore possible, for example, for only the ring segments 41, 42, 43, 44 or the individual segments 45 of the ring segments 41', 42', 43', 44' to be formed from a soft-magnetic material, while the support 20, on which the ring segments 41, 42, 43, 44 and 41', 42', 43', 44' are provided, may be composed of a different material.

By way of example, the support 20 may be formed from a glass-fiber-reinforced fiber composite material, which is distinguished by being light and robust, while furthermore also being able to provide a smooth surface. This correspondingly results in the stator 24 being light in weight with good durability, and in the stator 24 producing little noise, because of the smooth surface.

Figure 9:
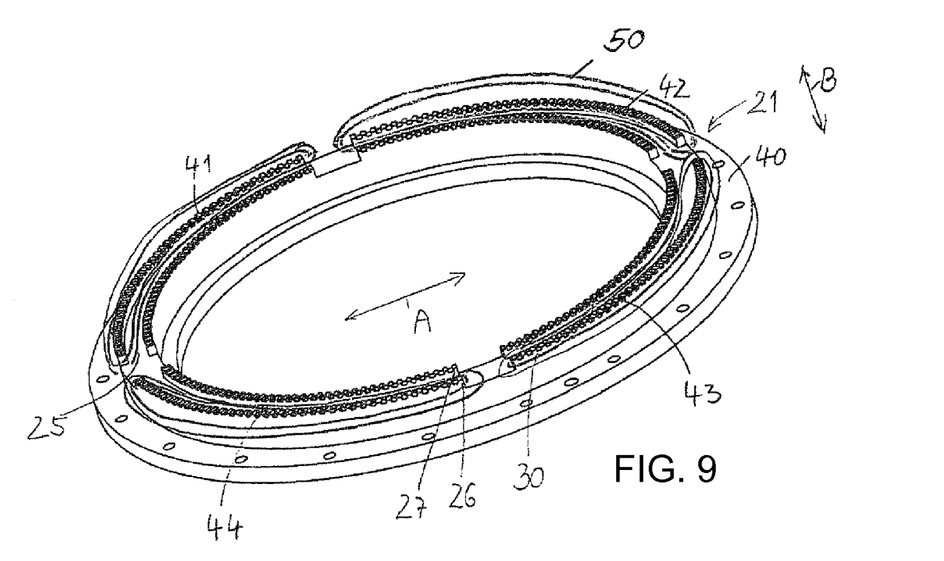
FIG. 9 shows a schematic perspective view of a stator according to a further embodiment of the transverse flux motor according to the invention with internally hollow windings.

FIG. 9 schematically shows a stator 21 according to a further embodiment of the transverse flux motor according to the invention, in which at least one internally hollow winding 50 was used per ring segment 41, 42, 43, 44 as a winding for the individual ring segments 41, 42, 43, 44. By way of example, the internally hollow winding 50 may be formed by a copper tube.

A cooling liquid can be passed through the internally hollow winding 50, thus allowing the transverse flux motor according to the invention to be cooled during its operation.

Figure 10:
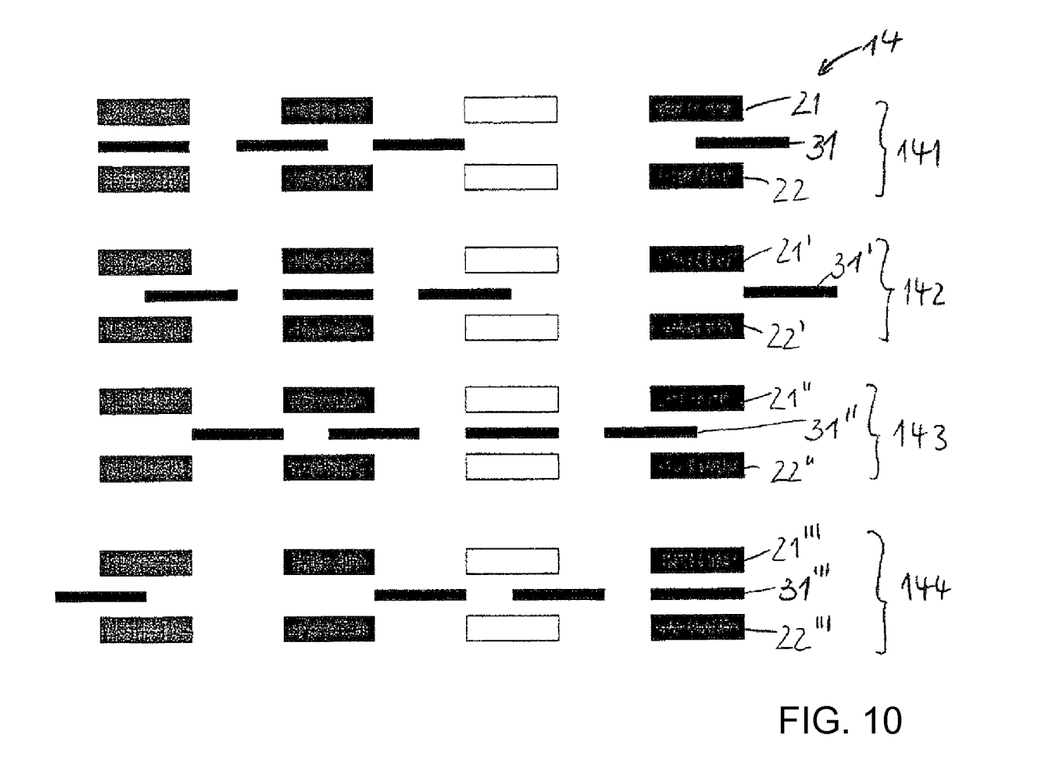
FIG. 10 schematically shows an embodiment of the drive method according to the invention, in which the positions of rotor elements with respect to stator elements are illustrated for each phase in four main rotation positions, using the example of a transverse flux motor with four stator-rotor-stator arrangements like a sandwich.

FIG. 10 schematically shows one embodiment of a drive method according to the invention for a transverse flux motor 13 as is illustrated schematically, for example, in FIG. 3.

For this purpose, FIG. 10 schematically illustrates the positions of the rotor webs 33 with respect to the stator elements 21, 22, 23, 24 for each phase in each of the four main rotation positions, using the example of a motor with four phases and two groups.

Figure 11:
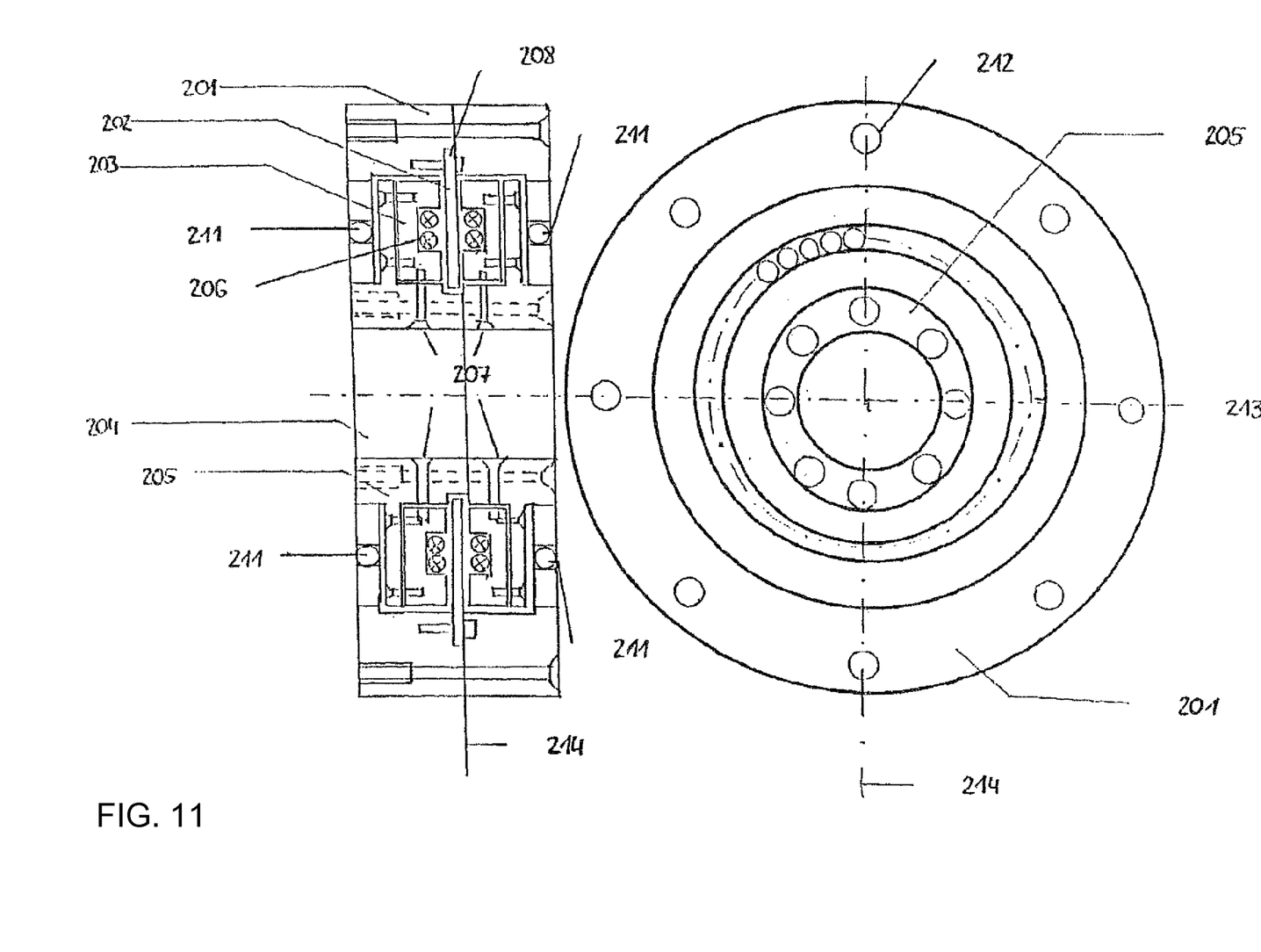
FIG. 11 shows a schematic sectioned side view and a schematic cross section of the transverse flux motor according to the invention as an external rotor motor.

FIG. 11 schematically shows the design of the transverse flux motor according to the invention, in the form of an external rotor motor. In this case, the stator elements 203 are arranged on a stator support 205, and are firmly connected to a support or a shaft 204 by suitable connecting elements 207. In this case, the connections for the conductor winding 206 may be passed to the exterior via the shaft 204 in a simple manner. The rotor 202 is connected in the outer area, for example via the holes 212 in a flange connection, to a rotating motor cage 201 or a motor casing, or some other suitable externally rotating component, for example a roller or a rim. Bearings 211 in this case fix the axial and radial position of the rotor 202 and the stator 203, 205 with respect to one another, without in the process impeding deliberate rotation about the rotation axis 213.

Figure 12:
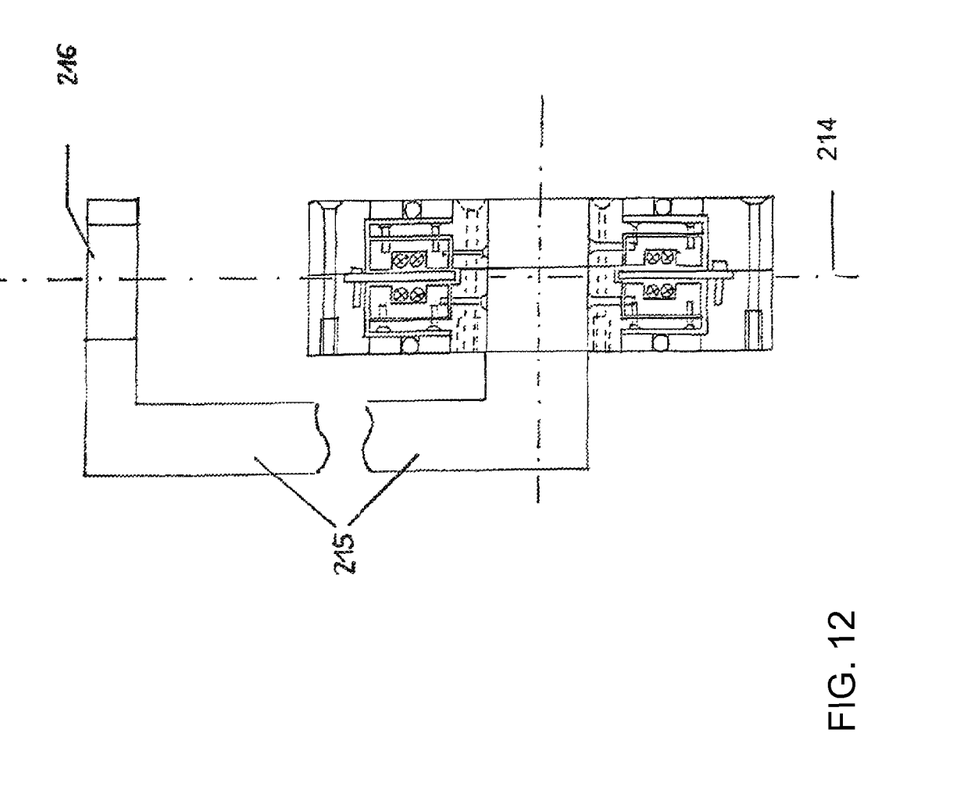
FIG. 12 schematically shows one embodiment of the external rotor motor with a suspension and bearing, which, for example, allows steering movements of 180°, and FIG. 13 schematically shows the option of modular arrangement of rotor-stator arrangements in a row.

FIG. 12 shows one embodiment variant of the transverse flux motor according to the invention having an apparatus for suspension and bearing. The U-shaped support 215 makes it possible for the entire motor to move about a rotation axis 214 in the bearing 216. When used as a wheel hub drive, for example, this makes it possible to vary the steering angle through 180°.

Figure 13:
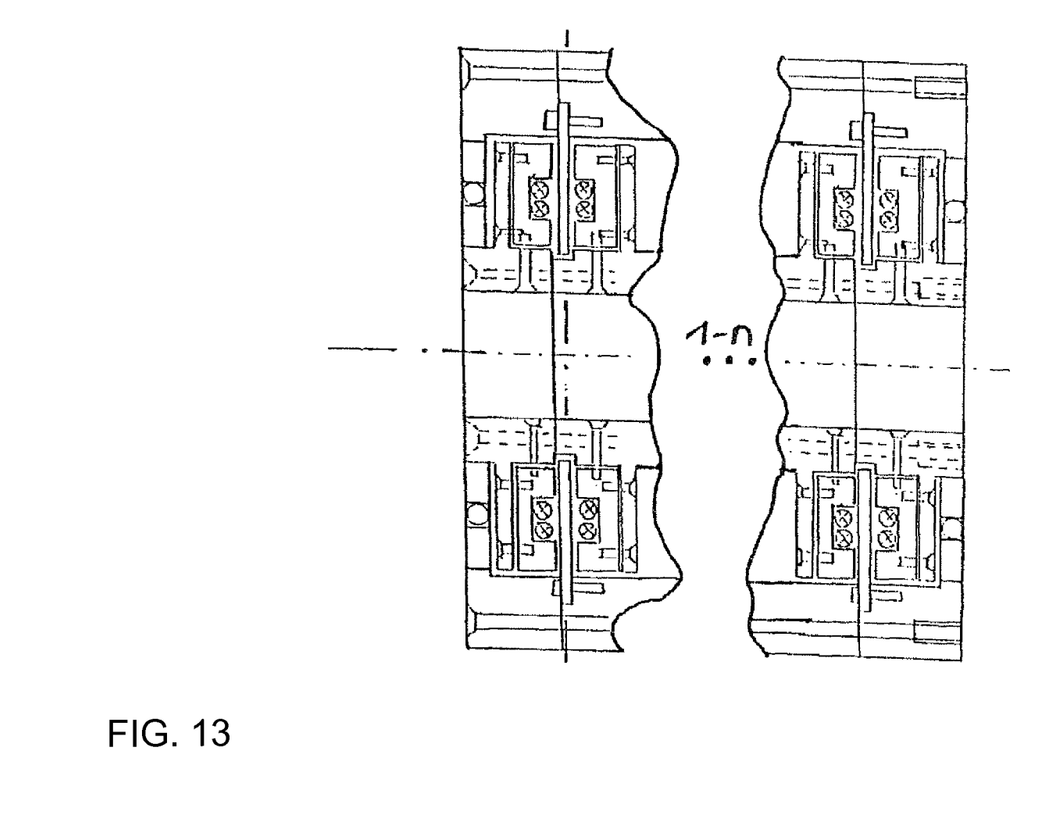

FIG. 13 shows the embodiment of the transverse flux motor according to the invention in the form of a section view of a variant consisting of a plurality of stack levels.

The invention claimed is:

1. A transverse flux motor, comprising:
   at least one stator and at least one rotor in axial alignment relative to the stator;
   wherein magnetically active elements of the stator are annular and have a U-shaped internal profile on the stator, vertical profile sides of the U-shaped internal profile are aligned parallel to the axial alignment of the stator, free ends of the vertical profile sides of the U-shaped internal profile have poles which are separated from one another, and the stator is connected to a stationary support or to a stationary shaft, and the rotor is in the form of a disk; and
   wherein the rotor is connected to a rotatable radially external motor casing, and the rotor has magnetically active webs of soft-magnetic material which are provided in the form of a ring in radial alignment on at least one end surface of the rotor.

2. The transverse flux motor according to claim 1, wherein the vertical profile sides of the U-shaped internal profile are separated by a distance in the radial alignment of the stator, which distance corresponds approximately to the length of the radial extent of the webs on the rotor.

3. The transverse flux motor according to claim 1, wherein the stator has three, four or more magnetically active elements which are arranged uniformly on the stator, are separated from one another uniformly and are in the form of ring segments.

4. The transverse flux motor according to claim 3, wherein the poles are like teeth, with each pole on one vertical profile side of a ring segment being opposite one pole on the other vertical profile side of the ring segment in the radial alignment of the stator.

5. The transverse flux motor according to claim 3, wherein the transverse flux motor is designed like a sandwich, with a rotor being arranged between a first and a second stator such that each of the end surfaces of the rotor is opposite a stator end surface with ring segments which project axially therefrom in the direction of the rotor.

6. The transverse flux motor according to claim 5, wherein four identical ring segments are in each case provided on the first stator and on the second stator, with the stators being arranged such that the ring segments are each opposite, and in which case current can flow through the ring segments with a phase shift of 180° such that, of the respectively opposite ring segments of the stators, current flows through one but not the other.

7. The transverse flux motor according to claim 3, wherein the stator has a support composed of a non-magnetic material, and the ring segments are formed from soft-magnetic material.

8. The transverse flux motor according to claim 1, wherein the stator has at least one internally hollow winding.

9. The transverse flux motor according to claim 1, wherein the stator is connected to a U-shaped support.

10. The transverse flux motor according to claim 1, wherein the stator support, the stator ring segments and the conductor winding are combined to form a stator block.

11. A drive method based on the transverse flux principle, wherein current flows through magnetically active elements of at least one stator which have a U-shaped internal profile on the stator, wherein vertical profile sides of the U-shaped internal profile are aligned parallel to the axial alignment of the stator, and free ends of the vertical profile sides of the U-shaped internal profile have poles which are separated from one another, and the magnetically active elements interact with at least one rotor in an axial direction relative to the stator in order to cause the rotor to rotate, wherein the rotor is moved around a pole in the rotation direction in relation to the stator when any current flows through, providing the magnetically active elements on the stator in the form of a ring in radial alignment on at least one end surface of at least one rotor which is in the form of a disc and is connected to a rotatable radially external motor casing, and causing the magnetically active elements on the stator to interact with magnetically active webs of soft-magnetic material.

12. The drive method according to claim 11, wherein the magnetically active elements on the stator are at least three rings or ring segments through which current flows differently, with the vertical profile sides of the U-shaped internal profile of the ring segments being aligned parallel to the axial alignment of the stator, and with free ends of the vertical profile sides of the U-shaped internal profile having poles which are separated from one another, and with the rotor being moved around a pole in the rotation direction in relation to the stator when any current flows through.

13. The drive method according to claim 11, wherein the rotor is arranged like a sandwich between a first stator having four ring segments and a second stator having four ring segments, current flows through the ring segments of the first and of the second stator with a phase shift of 180°, and current flows in the same way through the ring segments which are opposite on the stators.

14. The drive method according to claim 11, wherein a plurality of stator-rotor-stator arrangements which are formed like a sandwich are provided as a stack arrangement, with current flowing through the stack levels sequentially with a phase shift with respect to one another.

15. The drive method according to claim 11, wherein, in the case of an arrangement in which only one stator is arranged opposite the rotor and is associated with it, current flows sequentially through the stator at least on three ring segments which are arranged uniformly on the stator.

* * * * *